(12) United States Patent
Luan et al.

(10) Patent No.: US 12,288,019 B2
(45) Date of Patent: Apr. 29, 2025

(54) METHOD, DEVICE, APPARATUS, READABLE STORAGE MEDIUM, AND PROGRAM PRODUCT OF CHIP DESIGN

(71) Applicant: Phytium Technology Co., Ltd., Tianjin (CN)

(72) Inventors: Xiaokun Luan, Tianjin (CN); Yongfeng Sun, Tianjin (CN); Jianfeng Jiang, Tianjin (CN); Shaoxian Bian, Tianjin (CN); Wei Huang, Tianjin (CN); Yu Deng, Tianjin (CN); Zhanzhi Chen, Tianjin (CN); Wenjiang Jin, Tianjin (CN); Cuina Wang, Tianjin (CN); Tao Tang, Tianjin (CN)

(73) Assignee: PHYTIUM TECHNOLOGY CO., LTD., Tianjin (CN)

( * ) Notice: Subject to any disclaimer, the term of this patent is extended or adjusted under 35 U.S.C. 154(b) by 610 days.

(21) Appl. No.: 17/708,547

(22) Filed: Mar. 30, 2022

(65) Prior Publication Data

US 2022/0318476 A1 Oct. 6, 2022

(30) Foreign Application Priority Data

Mar. 30, 2021 (CN) .......................... 202110354903.X

(51) Int. Cl.
*G06F 30/392* (2020.01)
*G06F 30/394* (2020.01)
(Continued)

(52) U.S. Cl.
CPC .......... *G06F 30/392* (2020.01); *G06F 30/394* (2020.01); *G06F 2115/02* (2020.01); *G06F 2119/12* (2020.01)

(58) Field of Classification Search
USPC ....... 716/100, 101, 102, 104, 106, 108, 110, 716/111, 113
See application file for complete search history.

(56) References Cited

U.S. PATENT DOCUMENTS

2007/0260949 A1 11/2007 Fredrickson et al.
2011/0202894 A1* 8/2011 Chang ................... G06F 30/331
716/108

(Continued)

FOREIGN PATENT DOCUMENTS

| CN | 102800644 A | 11/2012 |
| CN | 103268380 A | 8/2013 |
| CN | 112257382 A | 1/2021 |

*Primary Examiner* — Brian Ngo
(74) *Attorney, Agent, or Firm* — ANOVA LAW GROUP, PLLC

(57) ABSTRACT

A chip design method includes determining a to-be-designed second device in a second module, arranging a second device in the first module, connecting the interface of the first device in the first module and the interface of the second device in the first module, performing physical design by analyzing physical wiring and time sequence convergence between the first device in the first module and the second device, copying the second device in the first module after the physical design as a designed second device in the second module, and disconnecting the interface of the first device in the first module from the interface of the second device in the first module and connecting the interface of the first device in the first module to an interface of the designed second device in the second module.

18 Claims, 6 Drawing Sheets

(51) Int. Cl.
*G06F 115/02* (2020.01)
*G06F 119/12* (2020.01)

(56) References Cited

U.S. PATENT DOCUMENTS

2020/0320243 A1* 10/2020 Hwang ............... H01L 25/0657
2023/0227509 A1* 7/2023 Kim ................... A61K 47/6811
424/185.1

* cited by examiner

METHOD, DEVICE, APPARATUS, READABLE STORAGE MEDIUM, AND PROGRAM PRODUCT OF CHIP DESIGN

CROSS-REFERENCES TO RELATED APPLICATION

This application claims priority to Chinese Application No. 202110354903.X filed on Mar. 30, 2021, the entire content of which is incorporated herein by reference.

TECHNICAL FIELD

The present disclosure generally relates to the chip design technology field and, more particularly, to a chip design method, instrument, apparatus, readable storage medium, and program product.

BACKGROUND

A continuous increase of complexity of a digital integrated circuit system causes a continuous increase of complexity of circuit design. For example, for a system-on-a-chip (SoC), types and quantities of functional modules that form the SoC also continue to increase, and the data interaction between the modules in the system becomes more and more complex. In a chip design process, physical design (i.e., back-end design) is defined as a process of converting a circuit gate-level netlist into a geometric form, which covers all circuit generation steps after logic design and before chip fabrication, including module division, layout, wiring, etc. The layout quality of the back-end design has a significant impact on the performance, area, yield, and reliability of the circuit. As mentioned above, the increase in the complexity of the digital integrated circuit causes an increase in the complexity of the circuit design. Thus, how to effectively improve design efficiency becomes very important.

SUMMARY

Embodiments of the present disclosure provide a chip design method. The method includes, for a first device in a first module, determining a to-be-designed second device in a second module, in the first module, arranging a second device in the first module such that an interface of the first device in the first module is on a same side as an interface of the second device in the first module, based on the data connection interaction between the first device in the first module and the to-be-designed second device in the second module, connecting the interface of the first device in the first module and the interface of the second device in the first module, performing physical design by analyzing physical wiring and time sequence convergence between the first device in the first module and the second device in the first module, in the second module, copying the second device in the first module after the physical design as a designed second device in the second module so that the first device in the first module and the designed second device in the second module are axisymmetric to each other, and disconnecting the interface of the first device in the first module from the interface of the second device in the first module and connecting the interface of the first device in the first module to an interface of the designed second device in the second module. The second device to be designed in the second module has a data connection interaction with the first device in the first module.

Embodiments of the present disclosure provide a chip design apparatus, including a processor and a memory. The memory stores computer-readable codes that, when executed by the processor, causes the processor to, for a first device in a first module, determine a to-be-determined second device in a second module, in the first module, arrange a second device in the first module such that an interface of the first device in the first module is on a same side as an interface of the second device in the first module, based on the data connection interaction between the first device in the first module and the to-be-designed second device in the second module, connect the interface of the first device in the first module and the interface of the second device in the first module, perform physical design by analyzing physical wiring and time sequence convergence between the first device in the first module and the second device in the first module, in the second module, copy the second device in the first module after the physical design as a designed second device in the second module so that the first device in the first module and the designed second device in the second module are axisymmetric to each other, and disconnect the interface of the first device in the first module from the interface of the second device in the first module and connect the interface of the first device in the first module to an interface of the designed second device in the second module. The second device to be designed in the second module has a data connection interaction with the first device in the first module.

Embodiments of the present disclosure provide a computation apparatus, including a processor and a memory. The memory stores computer-readable codes that, when executed by the processor, causes the processor to, for a first device in a first module, determine a to-be-determined second device in a second module, in the first module, arrange a second device in the first module such that an interface of the first device in the first module is on a same side as an interface of the second device in the first module, based on the data connection interaction between the first device in the first module and the to-be-designed second device in the second module, connect the interface of the first device in the first module and the interface of the second device in the second module, perform physical design by analyzing physical wiring and time sequence convergence between the first device in the first module and the second device in the first module, in the second module, copy the second device in the first module after the physical design as a designed second device in the second module so that the first device in the first module and the designed second device in the second module are axisymmetric to each other, and disconnect the interface of the first device in the first module from the interface of the second device in the first module and connect the interface of the first device in the first module to an interface of the designed second device in the second module. The second device to be designed in the second module has a data connection interaction with the first device in the first module.

DETAILED DESCRIPTION OF THE EMBODIMENTS

Figure 1A:
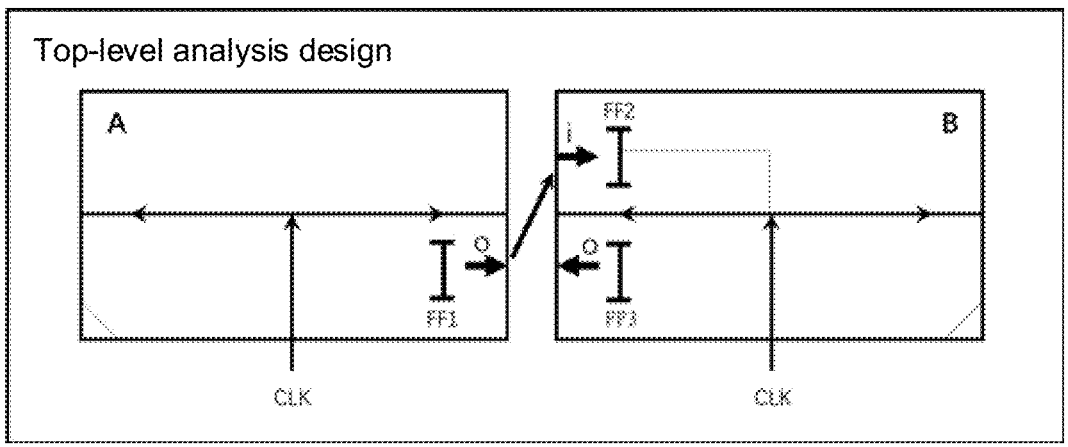
FIG. 1A is a schematic diagram of a chip physical design.

The technical solution of embodiments of the present disclosure is described in detail below with reference to the accompanying drawings of embodiments of the present disclosure. Apparently, described embodiments are only some embodiments of the present disclosure, but not all embodiments. Based on embodiments of the present disclosure, all other embodiments obtained by those of ordinary skill in the art without creative efforts are within the scope of the present disclosure.

Moreover, as shown in the specification and the claims, unless otherwise specified in the context, the terms "a," "an," "one," and/or "the" are not intended to be specified to the singular but also the plural. As used in the present disclosure, a similar term such as "first" and "second" does not imply any order, quantity, or importance but is merely used to distinguish various components. Similarly, a term such as "include" or "contain" means that an element or an item appearing before the term covers an element or item recited after the term and their equivalents but do not exclude other elements or items. The term such as "connected" or "coupled" are not limited to physical or mechanical connections but may include electrical connections, no matter direct or indirect.

Physical design complexity continues to increase with a process improvement. More than billions of transistors are involved in a complex design. A circuit scale of a performance-driven design (such as CPU, graphics card) continues to increase. While a handheld mobile design, embedded medical, and an aerospace communication product have higher functional requirements, stricter restrictions may be applied on power consumption. A time cycle to push the product to market continues to be shortened, which causes requirements for the design efficiency of the chip physical design and a success rate of one-time tape out to become higher and higher.

A layout design needs to be completed for the chip physical design. The layout design may include determining a position of a functional module (implemented through floorplan and placement) and effectively connecting the modules within a specified boundary of the chip (i.e., wiring). Thus, the physical design may be generally divided into several steps, including functional division, floorplan, standard cell placement, clock tree synthesis, signal wiring, time sequence convergence (i.e., verification and optimization of a time sequence constraint), etc.

In some embodiments, functional module division can include dividing a large design into small sub-designs (i.e., a whole circuit being divided into a plurality of modules), such as module division according to functions. In a physical design process, for two functional modules with data connection interaction, even a very small amount of interaction logic, separate physical designs may be needed for the two modules, and information such as interface time sequence may be analyzed after the physical designs are completed for the two modules. This may limit the efficiency of chip design and chip analysis and unnecessarily increase the chip design cycle.

FIG. 1A is a schematic diagram of a chip physical design. As shown in FIG. 1A, assume data connection interaction exists between module A and module B. For example, an output port of device FF1 in module A is connected to an input port of device FF2 of module B, i.e., there exists data connection interaction from device FF1 to device FF2. Modules A and B each further include other devices. For example, as shown in FIG. 1A, module B further includes a device FF3. In other words, modules A and B may include other devices that are not shown.

In the existing technology, in order to realize the data connection between the output port of the device FF1 in module A and the input port of the device FF2 in module B, the design analysis such as connection time sequence may be performed. The physical design may need to be performed on each of module A and module B at first to obtain designed module A and designed module B (a "designed module" refers to a module obtained by physical design). Then, after the physical designs of module A and module B, connection lines may be connected between the output port of the device FF1 and the input port of the device FF2 to perform a design analysis process.

The analysis process between module A and module B after the physical design shown in FIG. 1A may be referred to as a top-level analysis design. In such a top-level analysis design process in the existing technology, since the analysis is performed on the information such as the interface time sequence after the physical designs of the two modules are completed, the efficiency of chip design may be limited. For example, if a design defect is found when the above interface time sequence of FF1 and FF2 is analyzed after the physical designs are completed, the physical designs of module A and module B may need to be readjusted, which will inevitably increase the chip design time.

In order to solve the technical problems described above, some embodiments of the present disclosure provide a chip design method to improve the design efficiency of the physical design, so as to shorten the design time while ensuring the design effect. In some embodiments, the chip of the present disclosure generally refers to various types of integrated circuit structures, such as a microprocessor, a memory, a logic device, an analog device, etc., which are not limited here. Unless otherwise specified, all terms used in the present specification have the same meaning as commonly understood by those of ordinary skill in the art.

Figure 1B:
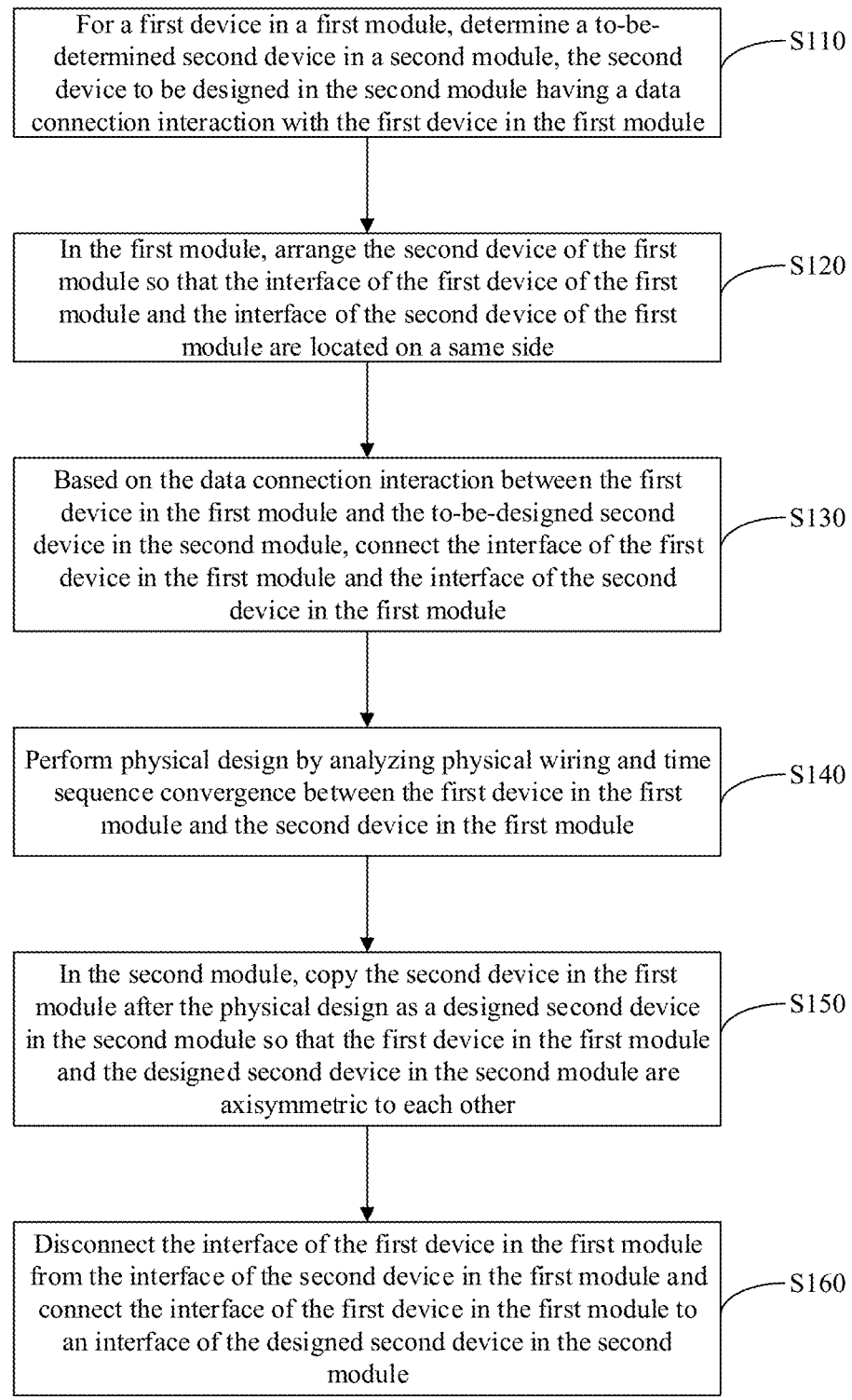
FIG. 1B is a schematic flowchart of a chip design method according to some embodiments of the present disclosure.

In order to describe the technical solution of the chip design method in detail according to the embodiment of the present disclosure, FIG. 1B is a schematic flowchart of a chip design method according to some embodiments of the present disclosure. An implementation process of the chip design method according to embodiments of the present disclosure is described below in connection with FIG. 1B.

As shown in FIG. 1B, at S110, a second device in a second module that is to be designed (a to-be-designed second device in a second module) is determined, the second device having data connection interaction with a first device in a first module. Before S110, a function division in the chip physical design has been completed. According to some embodiments of the present disclosure, the division can be based on functions of the first module and the second module that are implemented, respectively. In a chip physical design phase, a factor that usually needs to be considered in a module division may include a quantity of modules, signal interconnection between the modules, etc. Circuits within the modules need to be compactly arranged to improve circuit performance. In embodiments of the present disclosure, the first module may be different from the second module. For example, the first module may include module A, and the second module may include module B.

In an overall chip design process, a previous phase before the physical design may include a circuit design (i.e., a gate-level implementation). In the circuit design, the logic synthesis of the digital front-end design may be completed to obtain a gate-level circuit netlist to output to the physical design phase. Thus, for module A and module B obtained by the module division, for the first device in module A (i.e., FF1 in FIG. 1A), the second device in module B (i.e., FF2 in FIG. 1A) has a data connection interaction with the first device in module A. In addition, the chip design method of embodiments of the present disclosure is described by using device FF1 in module A and device FF2 in module B as an example, but may be also suitable for other devices, for example, a certain device n in module A, with a certain device m in a module C being correspondingly determined, where device n and device m have digital connection interaction.

At S120, in the first module, the second device of the first module is arranged so that the interface of the first device of the first module and the interface of the second device of the first module are located on a same side. That is, a duplicate of the second device is arranged in the first module.

To facilitate description, device FF2 that is added to module A may be referred to as device FF2 of module A, and device FF2 that is not subject to arrangement design in module B may be referred to as to-be-designed device FF2 of module B.

In the chip design method of embodiments of the present disclosure, to-be-designed second device FF2 of the module B has the data connection interaction with first device FF1 of the module A. Module A itself may not include device FF2. In embodiments of the present disclosure, in the physical design phase of module A, device FF2 may be arranged in module A so that the interface of first device FF1 of module A and the interface of second device FF2 in module A are located on the same side.

Figure 2A:
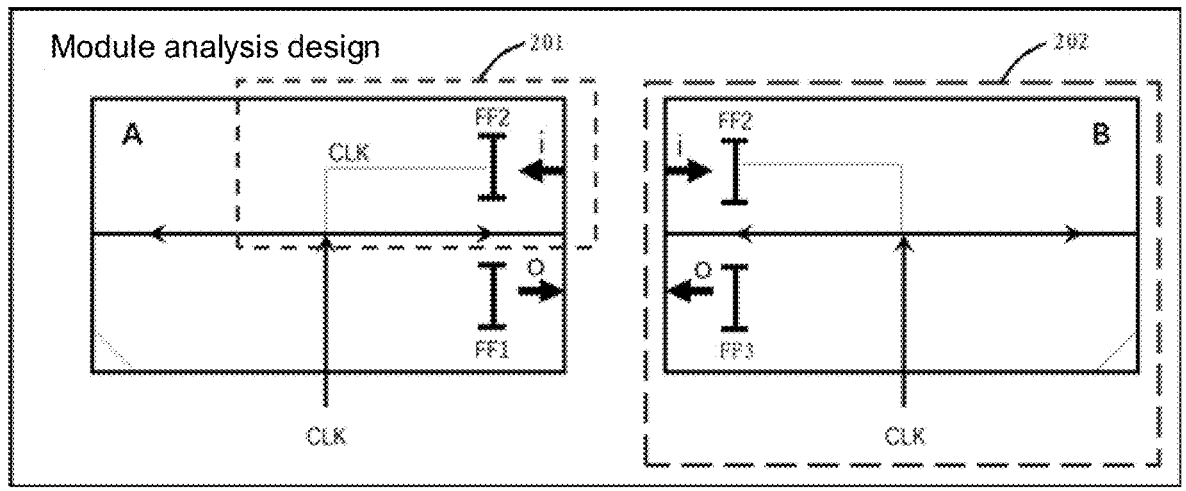
FIG. 2A is a schematic diagram of a module analysis design according to some embodiments of the present disclosure.

In some embodiments, FIG. 2A is a schematic diagram of a module analysis design according to some embodiments of the present disclosure. As shown in FIG. 2A, device FF2 is arranged on the same side as device FF1, which is represented as a portion in dashed box 201 in FIG. 2A. Since this phase is the physical design phase of module A, module B is represented with a dashed box 202. That is, the physical design of module B may not currently be performed.

At S120, device FF2 that is not included in module A is added in module A, so as to realize the time sequence verification between device FF1 and device FF2 in the module analysis design phase of module A. In addition, the arrangement here may include adding device FF2 in module A and further include performing an operation, such as design and wiring related to device FF2, in module A, for example, wiring in the time signal CLK, etc.

Then, as shown in FIG. 1B, at S130, based on the data connection interaction between the first device in the first module and the second device in the second module that is to be designed, the interface of the first device in the first module is connected to the interface of the second device in the first module. In embodiments of the present disclosure, connecting the interface of the first device in the first module and the interface of the second device in the first module based on the data connection interaction between the first device of the first module and the second device of the second module that is to be designed includes, for example, determining a data transmission direction between the first device of the first module and the second device of the second module that is to-be-designed, and connecting the interface of the first device of the first module to the interface of the second device in the first module based on the data transmission direction.

Figure 2B:
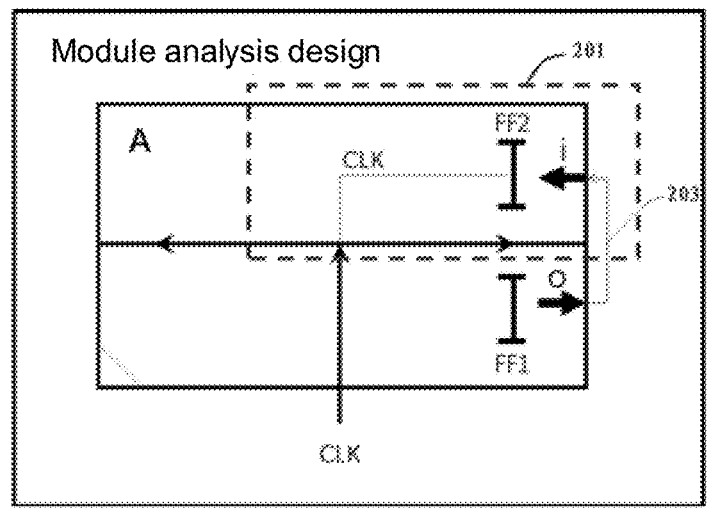
FIG. 2B is a schematic diagram of another module analysis design according to some embodiments of the present disclosure.

For example, the data transmission direction may be outputting signal from device FF1 of module A to device FF2 of module B. Based on this, FIG. 2B is a schematic diagram of another module analysis design according to some embodiments of the present disclosure. In FIG. 2B, according to an original data transmission direction of device FF1 and device FF2, line connection may be performed on device FF1 and device FF2 that is added, which is shown as a line connection 203.

As shown in FIG. 1B, at S140, after the interface of the first device in the first module and the interface of the second device in the first module are connected, the physical design is performed by analyzing physical wiring and a time sequence convergence of the first device of the first module and the second device in the first module.

The circuit performance of the back-end design may include time sequence delay, crosstalk, etc. Resistance of an interconnect of metal and poly of a circuit is limited. A long wire may cause increased resistance, a longer delay, and more obvious crosstalk. A connection point and a through-hole may also reduce a signal transmission speed. The above physical analysis process may be the design related to the circuit performance and may also include another analysis process, for example, an analysis on the time sequence convergence, etc.

Compared to the existing technology shown in FIG. 1A, in which the time sequence analysis process needs to be performed after the physical designs of module A and module B are both completed, in the present disclosure, the time sequence analysis process can be advanced to the physical design phase of module A, as shown in FIG. 1B at S140. That is, the time sequence analysis of device FF1 of module A and device FF2 of module B may be completed in the design process of module A. As such, a design defect may be found as early as possible, and the design time may be shortened. A design lag caused by finding the design defect after the physical designs of the modules are completed can be avoided. In embodiments of the present disclosure, the above beneficial effects may be realized by adding device FF2 in module A in processes S120 and S130.

As shown in FIG. 1B, at S150, in the second module, the second device in the first module after the physical design is copied as a second device in the second module after the design (a designed second device in the second module). Thus, the first device of the first module is axisymmetric with the second device in the second module after the design. Then, at S160, the interface of the first device of the first module and the interface of the second device in the first module are disconnected, and the interface of the first device of the first module and the interface of the second device in the second module after the design are connected.

Figure 3:
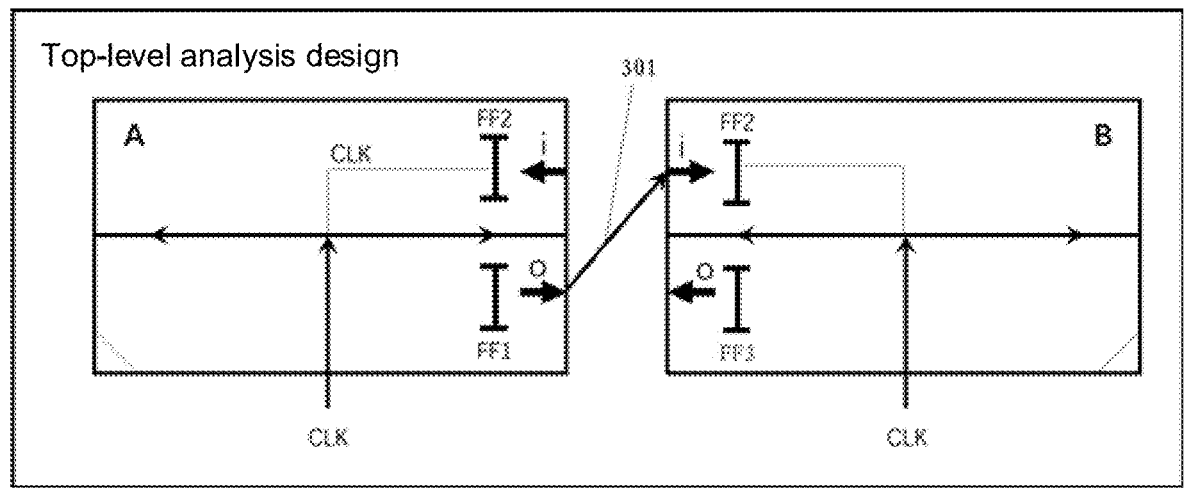
FIG. 3 is a schematic diagram of a top-level analysis design according to some embodiments of the present disclosure.

FIG. 3 is a schematic diagram of a top-level analysis design according to some embodiments of the present disclosure, which shows a logical relationship of data interaction between module A and module B after the design. The first device in the first module being axisymmetric with the second device in the second module after the design refers to that device FF1 in module A and device FF2 in module B in FIG. 3 are mirror symmetrical to each other. For example, in FIG. 3, device FF1 in module A and device FF2 in module B are symmetrical to each other about a vertical direction. This is because in the chip physical design phase, a layout design goal may include minimizing the chip area and interconnect delay. The interconnect between device FF1 and device FF2 may be shortened by making the first device in the first module axisymmetric with the second device in the second module after the design. That is, a physical distance between portions of module A and module B where the data interaction exists may be shortened, thereby reducing the wiring delay and improving the circuit performance.

In embodiments of the present disclosure, in processes S120 and S130, device FF2 is additionally designed in module A to realize the physical design of module A. Then, in the physical design phase of module B, since device FF2 has been analyzed in the design phase of module A, device FF2 in module A after the physical design may be directly duplicated as device FF2 in module B after the design. In other words, in the physical design process of module B, device FF2 may be implemented by copying device FF2 from module A. Thus, this part (i.e., device FF2) may only need to be implemented once in the physical design.

Then, after the physical designs of module A and module B are completed, respectively, an original data interaction logic relationship may need to be restored. That is, in the original design, module A does not include device FF2. Device FF2 in module A is added to analyze the interface time sequence between device FF1 and device FF2 in advance. Thus, in the top-level analysis phase after the physical designs of module A and module B are completed, the connection line from device FF1 to device FF2 in module A may be disconnected. That is, connection line 203 shown in FIG. 2B is disconnected. In embodiments of the present disclosure, based on the data transmission direction between the first device in the first module and the second device in the second module that is to be designed, the interface of the first device in the first module may be connected to the interface of the second device in the second module after the design. As shown in FIG. 3, a connection line 301 between device FF1 in module A and device FF2 in module B is provided. That is, device FF2 will continue to remain in module A, and only connection line 203 is disconnected. Thus, additionally designed device FF2 may not affect a subsequent top-level analysis result.

In the chip design method of embodiments of the present disclosure, in the physical design phase of a module (such as module A), interface multiplexing may be realized by multiplexing a device that has data interaction with another module (such as module B). By connecting corresponding multiplexed interfaces, the interface time sequence analysis of the data interaction may be realized for this part in the physical design phase of module A, thereby improving the chip design efficiency.

In embodiments of the present disclosure, before process S120, the method further includes, in the design phase of the first module, determining whether the second device has already been included in the first module. The above description in connection with FIG. 2A corresponds to that module A does not include device FF2. Thus, device FF2 may be added in module A to perform the interface analysis. That is, in response to determining that the second device is not included in the first module, the second device may be added to the first module.

In some other embodiments, the method further includes determining that the first module already includes the second device. In some embodiments, the devices in module A and module B may be exactly the same in portions having data interaction. For example, both module A and module B include device FF1 and device FF2. Thus, in the physical design process of module A, device FF1 in module A may be directly connected to device FF2 in module A, so as to perform the interface analysis between module A and module B in module A.

Another aspect of the present disclosure provides a chip design apparatus, which may be configured to improve the chip design efficiency. In some embodiments, in the chip design apparatus of embodiments of the present disclosure, the second device of the second module that is to be designed may be determined first according to the gate-level circuit netlist obtained by the front-end design. The second device may have the data connection interaction with the first device in the first module. Thus, in the physical design phase of a first module (such as module A), the interface multiplexing may be realized by multiplexing a device that has the data interaction with another module (such as module B). By connecting the corresponding multiplexed interfaces, the interface time sequence of the data interaction may be realized for this part in the physical design phase of module A. As such, the chip design efficiency may be improved, and the chip design cycle may be shortened.

Figure 4:
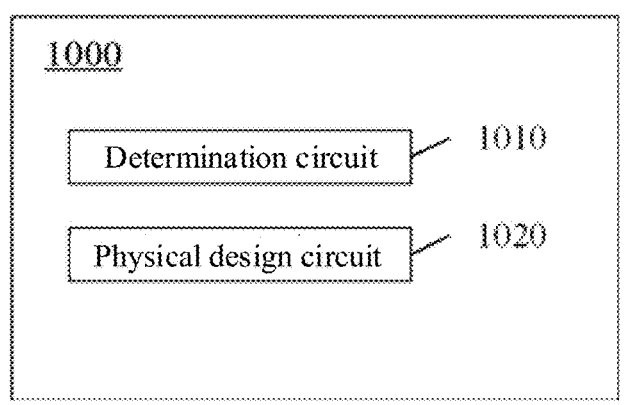
FIG. 4 is a schematic block diagram of a chip design instrument according to some embodiments of the present disclosure.

FIG. 4 is a schematic block diagram of a chip design instrument 1000 according to some embodiments of the present disclosure. As shown in FIG. 4, the chip design device 1000 includes a determination circuit 1010 and a physical design circuit 1020.

In some embodiments of the present disclosure, determination circuit 1010 may be configured to determine the second device in the second module that is to be designed that has the data connection interaction with the first device in the first module. For example, the determination circuit 1010 may be configured to perform the above determination based on the gate-level circuit netlist obtained by the front-end design.

Then, the physical design circuit 1020 may be configured to arrange the second device to be located in the first module such that the interface of the first device in the first module and the interface of the second device in the first module are located on the same side. The physical design circuit 1020 may be further configured to, based on the data connection interaction between the first device in the first module and the second device in the second module that is to be designed, connect the interface of the first device in the first module to the interface of the second device in the first module and perform the physical design by analyzing the physical wiring and time sequence convergence between the first device in the first module and the second device in the first module. The physical design circuit 1020 may be further configured to, in the second module, copy the second device in the first module after the physical design as the second device in the second module after the design. Thus, the first device in the first module may be axisymmetric with the second device in the second module after the design. The physical design circuit 1020 may be further configured to disconnect the interface of the first device in the first module and the interface of the second device in the first module and connect the interface of the first device in the first module to the interface of the second device in the second module after the design.

In embodiments of the present disclosure, the physical design circuit may be configured to, in the design phase of the first module, determine whether the second device has been included in the first module and, in response to determining that the second device is not included in the first module, add the second device in the first module.

In embodiments of the present disclosure, the physical design circuit may be configured to determine the data transmission direction between the first device in the first module and the second device in the second module that is to be designed and connect the interface of the first device in the first module to the interface of the second device in the first module based on the data transmission direction.

In embodiments of the present disclosure, the physical design circuit may be configured to, based on the data transmission direction between the first device in the first module and the second device in the second module that is to be designed, connect the interface of the first device in the first module to the interface of the second device in the second module after the design.

In embodiments of the present disclosure, the first module may be different from the second module. The first module and the second module may be divided based on the functions that are implemented by the first module and the second module, respectively.

For the processes performed by the chip design apparatus 1000, reference may be made to the chip design method described in connection with the accompanying drawings of the present disclosure, which is not repeated here.

Figure 5:
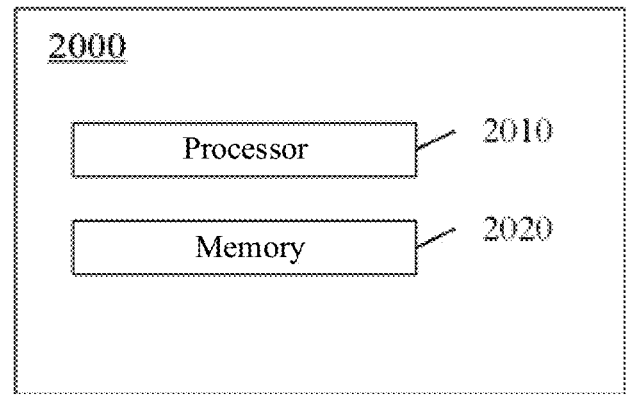
FIG. 5 is a schematic block diagram of a chip design apparatus according to some embodiments of the present disclosure.

Another aspect of the present disclosure provides a chip design apparatus. FIG. 5 is a schematic block diagram of a chip design apparatus 2000 according to some embodiments of the present disclosure.

As shown in FIG. 5, the chip design apparatus 2000 includes a processor 2010 and a memory 2020. In embodiments of the present disclosure, the memory 2020 may store computer-readable codes that, when executed by the processor 2010, cause the processor 2010 to perform the chip design method as described above.

The processor 2010 may be configured to perform various actions and processes according to programs stored in the memory 2020. In some embodiments, the processor 2010 may include an integrated circuit chip with signal processing capability. The processor may include a general-purpose processor, a digital signal processor (DSP), an application-specific integrated circuit (ASIC), an off-the-shelf programmable gate array (FPGA) or another programmable logic device, a discrete gate or transistor logic device, and a discrete hardware component. The processor 2020 may be configured to perform various methods, processes, and logical block diagrams in embodiments of the present disclosure. The general-purpose processor may include a microprocessor, or the processor may include any conventional processor, etc., and may include an X86 architecture or an ARM architecture, etc.

The memory 2020 may store the computer-executable instruction codes that, when executed by the processor 2010, cause the processor 2010 to implement the chip design method of embodiments of the present disclosure. The memory 2020 may include a volatile memory or nonvolatile memory, or may include both volatile and nonvolatile memories. The non-volatile memory may include a read-only memory (ROM), a programmable read-only memory (PROM), an erasable programmable read-only memory (EPROM), an electrical erasable programmable read-only memory (EEPROM), or a flash memory. The volatile memory may include a random access memory (RAM), which may be used as an external high-speed cache. Exemplarily and non-restrictively, many forms of RAM are available, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct memory bus random access memory (DR RAM). The memory described herein may be intended to include, but not be limited to, these and any other suitable types of memory.

Figure 6:
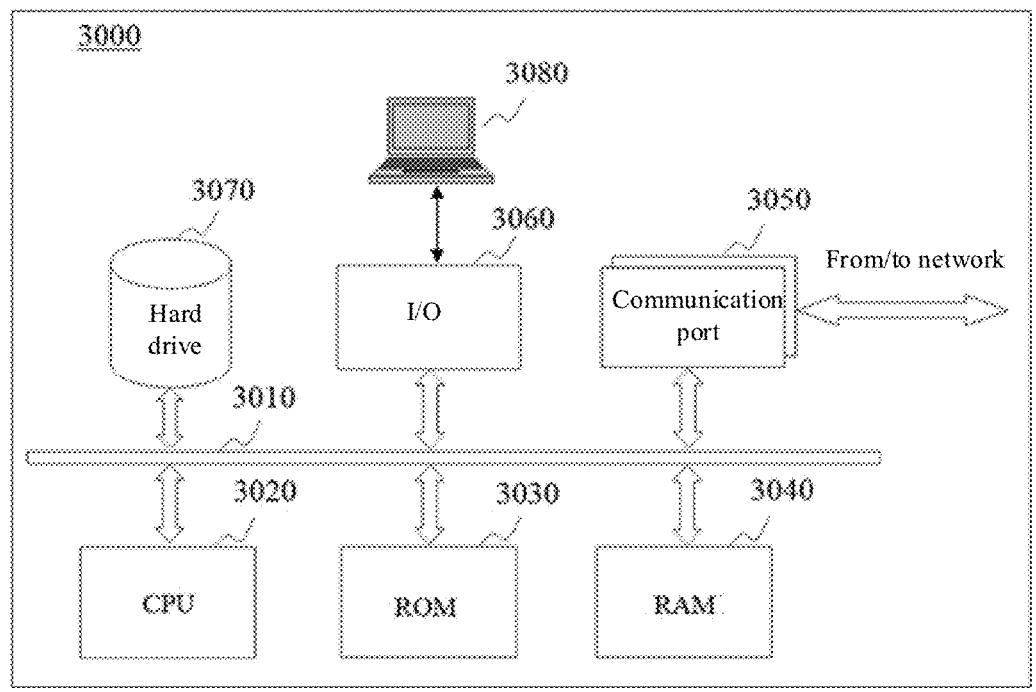
FIG. 6 is a schematic architectural diagram of an exemplary computation apparatus according to some embodiments of the present disclosure.

The method or apparatus of embodiments of the present disclosure may also be implemented by an architecture of a computation apparatus 3000 shown in FIG. 6. As shown in FIG. 6, the computation device 3000 includes a bus 3010, one or more central processing units (CPUs) 3020, a read-only memory (ROM) 3030, a random access memory (RAM) 3040, a communication port 3050 connected to a network, input/output circuit 3060, a hard drive 3070, etc. A storage apparatus in the computation apparatus 3000, such as the ROM 3030 or the hard drive 3070, may store various data or files used for processing and/or communication of the chip design method of the present disclosure and the program instructions executed by the CPU. The computation apparatus 3000 further includes a user interface 3080. The architecture shown in FIG. 6 is only exemplary. When different apparatuses are implemented, one or more components of the computation apparatus shown in FIG. 6 may be omitted according to actual needs. For example, the above computation apparatus 3000 may be implemented as a computer installed with a physical design application. For example, the physical design application may include an integrated circuit compiler (IC Compiler), or another application program, such as Encounter, Cadence Innovus, etc., which is not limited here.

Figure 7:
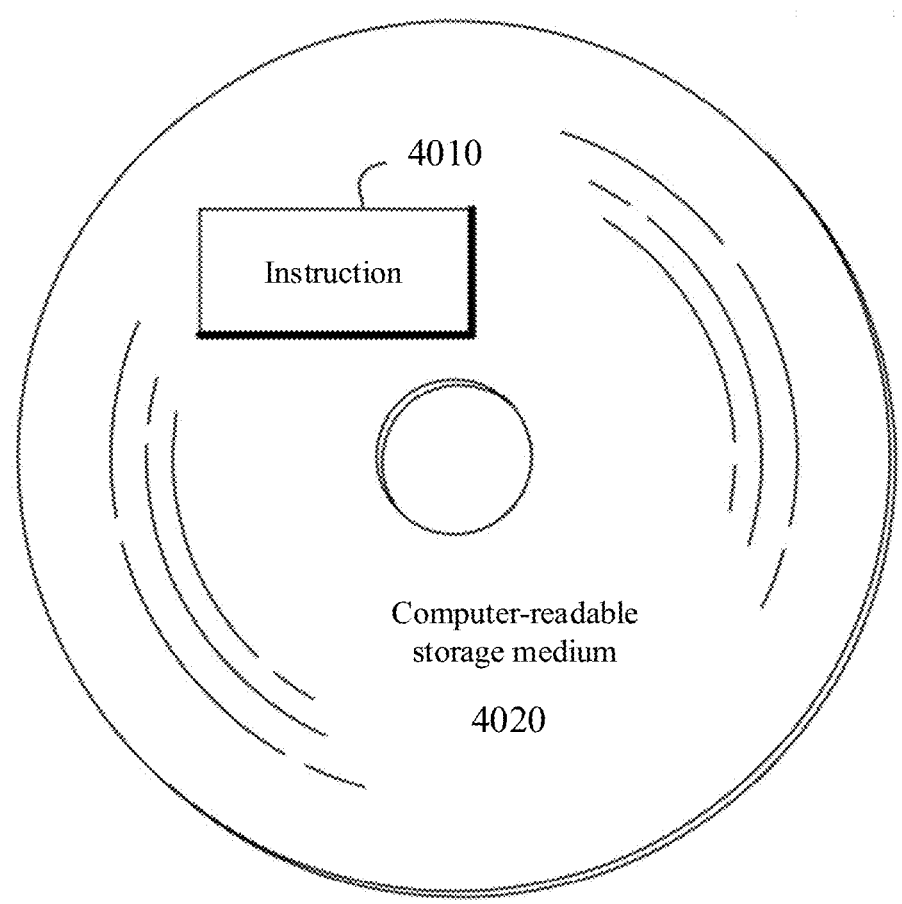
FIG. 7 is a schematic diagram of a non-transitory computer-readable storage medium according to some embodiments of the present disclosure.

Yet another aspect of the present disclosure provides a non-transitory computer-readable storage medium. FIG. 7 is a schematic diagram of a non-transitory computer-readable storage medium 4020 according to some embodiments of the present disclosure.

As shown in FIG. 7, the computer-readable storage medium 4020 stores instructions, such as computer-readable instructions 4010. When the computer-readable instructions 4010 are executed by the processor, the processor may be caused to perform the chip design method described in connection with the accompanying drawings. The computer-readable storage medium 4020 may include, but be not limited to, for example, a volatile memory and/or non-volatile memory. The volatile memory may include, for example, a random access memory (RAM) and/or cache memory (cache). The non-volatile memory may include, for example, a read-only memory (ROM), a hard drive, a flash memory, etc. For example, the computer-readable storage medium 4020 may be connected to a computation apparatus such as a computer. Then, when the computation apparatus runs the computer-readable instructions 4010 stored in the computer-readable storage medium 4020, the computation apparatus may perform the chip design method as described above.

Yet another aspect of the present disclosure provides a computer program product or computer program. The computer program product or computer program may include computer-readable instructions stored in the computer-readable storage medium. The processor of the computation apparatus may read the computer-readable instructions from the computer-readable storage medium, and the processor may execute the computer-readable instructions to cause the computation apparatus to perform the chip design method of the present disclosure.

Using the chip design method, instrument, apparatus, readable storage medium, and program product of embodiments of the present disclosure, in the chip design process, the devices with the data connection interaction and belonging to different functional modules may be realized. In the module design phase, the design process of the physical wiring and time sequence convergence may be realized by reusing the devices, thereby improving the chip design efficiency.

Those skilled in the art may understand that various modifications and improvements may be made to the content of the present disclosure. For example, the apparatuses or components described above may be implemented by hardware, software, firmware, or some or all combinations thereof.

In addition, the present disclosure makes various references to certain elements in the system of embodiments of the disclosure. However, any quantity of different elements may be used and run at client terminals and/or servers. The elements are illustrative only, and different aspects of the system and method may use different elements.

The flowcharts are used in the present disclosure to illustrate the processes of the method of embodiments of the present disclosure. Processes described earlier or later may not necessarily be performed in exact order. In contrast, the Processes may be performed in reverse order or simultaneously. An operation may also be added to these processes.

Those of ordinary skill in the art may understand that all or some of the processes in the above method may be completed by instructing relevant hardware through a computer program. The program may be stored in a computer-readable storage medium, such as a read-only memory, a magnetic disk, or an optical disk. In some embodiments, all or some of the processes of embodiments of the present disclosure may also be implemented using one or more integrated circuits. Correspondingly, the modules/units of embodiments of the present disclosure may be implemented in the form of hardware or in the form of a software functional module. The present disclosure is not limited to any particular form of a combination of hardware and software.

Unless otherwise specified, all terms used here have the same meaning as commonly understood by those of ordinary skill in the art. The terms such as those defined in ordinary dictionaries should be understood as having meanings consistent with the meanings in the context, but should not be described in an idealized or highly formalized meaning unless explicitly stated as such.

The above is the description of the present disclosure and should not be considered to limit the present disclosure. Although several exemplary embodiments of the present disclosure are described, those skilled in the art may understand that many modifications may be made to exemplary embodiments without departing from the novel teachings and advantages of the present disclosure. Thus, all these modifications are intended to be included within the scope of the present disclosure. The above is the description of the present disclosure and is not to be considered to be limited to the particular embodiments disclosed. The modifications to the disclosed embodiments and other embodiments are intended to be included within the scope of the disclosure. The present invention is defined by the claims and their equivalents.

What is claimed is:

1. A chip design method comprising:
   for a first device in a first module, determining a to-be-designed second device in a second module, the second device to be designed in the second module having a data connection interaction with the first device in the first module;
   in the first module, arranging a second device in the first module such that an interface of the first device in the first module is on a same side as an interface of the second device in the first module;
   based on the data connection interaction between the first device in the first module and the to-be-designed second device in the second module, connecting the interface of the first device in the first module and the interface of the second device in the first module;
   performing physical design by analyzing physical wiring and time sequence convergence between the first device in the first module and the second device in the first module;
   in the second module, copying the second device in the first module after the physical design as a designed second device in the second module so that the first device in the first module and the designed second device in the second module are axisymmetric to each other; and
   disconnecting the interface of the first device in the first module from the interface of the second device in the first module and connecting the interface of the first device in the first module to an interface of the designed second device in the second module.

2. The method of claim 1, wherein arranging the second device in the first module includes:
   in a design phase of the first module, determining whether the second device is included in the first module; and
   in response to determining that the second device is not included in the first module, adding the second device in the first module.

3. The method of claim 1, wherein based on the data connection interaction between the first device in the first module and the to-be-designed second device in the second module, connecting the interface of the first device in the first module and the interface of the second device in the first module includes:
   determining a data transmission direction between the first device in the first module and the to-be-designed second device in the second module; and
   connecting the interface of the first device in the first module with the interface of the second device in the first module based on the data transmission direction.

4. The method according to claim 1, wherein connecting the interface of the first device in the first module and the interface of the designed second device in the second module includes:
   based on a data transmission direction between the first device in the first module and the to-be-designed second device in the second module, connecting the interface of the first device in the first module and the interface of the designed second device in the second module.

5. The method of claim 1, wherein:
   the first module is different from the second module; and
   module division is based on functions implemented by the first module and the second module, respectively.

6. A non-transitory computer readable storage medium storing instructions that, when executed by a processor, cause the processor to perform the method of claim 1.

7. A chip design apparatus comprising:
a processor; and
a memory storing computer-readable codes that, when executed by the processor, causes the processor to:
for a first device in a first module, determine a to-be-determined second device in a second module, the second device to be designed in the second module having a data connection interaction with the first device in the first module;
in the first module, arrange a second device in the first module such that an interface of the first device in the first module is on a same side as an interface of the second device in the first module;
based on the data connection interaction between the first device in the first module and the to-be-designed second device in the second module, connect the interface of the first device in the first module and the interface of the second device in the first module;
perform physical design by analyzing physical wiring and time sequence convergence between the first device in the first module and the second device in the first module;
in the second module, copy the second device in the first module after the physical design as a designed second device in the second module so that the first device in the first module and the designed second device in the second module are axisymmetric to each other; and
disconnect the interface of the first device in the first module from the interface of the second device in the first module and connect the interface of the first device in the first module to an interface of the designed second device in the second module.

8. The apparatus of claim 7, wherein the processor is further caused to:
in a design phase of the first module, determine whether the second device is included in the first module; and
in response to determining that the second device is not included in the first module, add the second device in the first module.

9. The apparatus of claim 7, wherein the processor is further caused to:
determine a data transmission direction between the first device in the first module and the to-be-designed second device in the second module; and
connect the interface of the first device in the first module with the interface of the second device in the first module based on the data transmission direction.

10. The apparatus of claim 7, wherein the processor is further caused to:
based on a data transmission direction between the first device in the first module and the to-be-designed second device in the second module, connect the interface of the first device in the first module and the interface of the designed second device in the second module.

11. The apparatus of claim 7, wherein:
the first module is different from the second module; and
module division is based on functions implemented by the first module and the second module, respectively.

12. A computation apparatus comprising:
a processor; and
a memory storing computer-readable codes that, when executed by the processor, causes the processor to:
for a first device in a first module, determine a to-be-determined second device in a second module, the second device to be designed in the second module having a data connection interaction with the first device in the first module;
in the first module, arrange a second device in the first module such that an interface of the first device in the first module is on a same side as an interface of the second device in the first module;
based on the data connection interaction between the first device in the first module and the to-be-designed second device in the second module, connect the interface of the first device in the first module and the interface of the second device in the first module;
perform physical design by analyzing physical wiring and time sequence convergence between the first device in the first module and the second device in the first module;
in the second module, copy the second device in the first module after the physical design as a designed second device in the second module so that the first device in the first module and the designed second device in the second module are axisymmetric to each other; and
disconnect the interface of the first device in the first module from the interface of the second device in the first module and connect the interface of the first device in the first module to an interface of the designed second device in the second module.

13. The apparatus of claim 12, further comprising:
at least one of a communication port or an input/output circuit; and
a bus connected to the processor, the memory, and at least one of the communication port or the input/output circuit.

14. The apparatus of claim 12, further comprising:
a user interface connected to the input/output circuit.

15. The apparatus of claim 12, wherein the processor is further caused to:
in a design phase of the first module, determine whether the second device is included in the first module; and
in response to determining that the second device is not included in the first module, add the second device in the first module.

16. The apparatus of claim 12, wherein the processor is further caused to:
determine a data transmission direction between the first device in the first module and the to-be-designed second device in the second module; and
connect the interface of the first device in the first module with the interface of the second device in the first module based on the data transmission direction.

17. The apparatus of claim 12, wherein the processor is further caused to:
based on a data transmission direction between the first device in the first module and the to-be-designed second device in the second module, connect the interface of the first device in the first module and the interface of the designed second device in the second module.

18. The apparatus of claim 12, wherein:
the first module is different from the second module; and
module division is based on functions implemented by the first module and the second module, respectively.

* * * * *